United States Patent [19]

Depommier et al.

[11] B 3,991,167

[45] Nov. 9, 1976

[54] PROCESS FOR LOWERING NITROGEN OXIDES IN EFFLUENT GASES

[75] Inventors: Rene Depommier, La Madeleine; Edouard Martin, Saint Cloud, both of France

[73] Assignee: Produits Chimiques Ugine Kuhlmann, Saint-Denis, France

[22] Filed: July 24, 1974

[21] Appl. No.: 491,455

[44] Published under the second Trial Voluntary Protest Program on February 3, 1976 as document No. B 491,455.

[30] Foreign Application Priority Data

July 30, 1973 France .............................. 73.27774

[52] U.S. Cl. ............................ 423/393; 423/394; 423/235
[51] Int. Cl.² ................................... C01B 21/40
[58] Field of Search .................... 423/235, 393, 394

[56] References Cited

UNITED STATES PATENTS

| 1,348,873 | 8/1920 | Guye .............................. 423/394 |
| 3,733,393 | 5/1973 | Couillaud et al. ................ 423/235 |

FOREIGN PATENTS OR APPLICATIONS

| 14,902 | 8/1963 | Japan .............................. 423/393 |
| 316,735 | 8/1929 | United Kingdom ................ 423/393 |
| 289,412 | 9/1929 | United Kingdom ................ 423/393 |

*Primary Examiner*—G. O. Peters
*Attorney, Agent, or Firm*—Pennie & Edmonds

[57] ABSTRACT

A process for reducing the level of nitrogen oxide contaminants in an industrial effluent gas comprises (a) oxidizing said gas to convert the contaminants substantially to a mixture of $N_2O_3$ and $NO_2$ and (b) passing the oxidized gas through an aqueous medium containing an amount of hydrogen peroxide maintained at a level just sufficient to oxidize the $N_2O_3$ and $NO_2$ to $HNO_3$.

6 Claims, No Drawings

PROCESS FOR LOWERING NITROGEN OXIDES IN EFFLUENT GASES

BACKGROUND OF THE INVENTION

The present invention relates to a process for reducing the concentration of nitrogen oxides in the effluent gases from manufacturing plants.

Waste nitrogen oxides are released into the atmosphere both in the tail gases from plants manufacturing nitric acid and also in the residual gases produced by various plants using nitric acid as a reagent. There has been a constant search to minimize these waste products both for reasons of economy and to avoid pollution by toxic materials. Renewed emphasis to this search has been given by anti-pollution legislation in many countries. Such legislation characteristically sets limits to the weight of nitrogen oxides which may be released per ton of production, and generally excludes resorting to the simple palliative of diluting the exhaust gas with air.

Conventional plants manufacturing nitric acid from ammonia produce exhaust gases which contain from 1,000 to 2,000 cm$^3$ of nitrogen oxides per cubic meter of effluent. In contrast to this, recent trends in legislation seek to impose a maximum permissible exhaust of nitrogen oxides equal to 1.5 Kg. per ton of nitric acid produced, corresponding in conventional nitric acid plants to about 200 cm$^3$ of nitrogen oxides per cubic meter of the non-diluted tail gases.

The presence of nitrogen oxides in the effluent gases from nitric acid production can be understood in light of the well known reactions whereby the catalytic combustion of ammonia gives rise to nitric oxide, NO, which is inert to water. In the presence of oxygen, NO then forms nitrogen dioxide, which either by itself or in association with NO as dinitrogen trioxide then reacts with water on absorption columns according to the following reactions (1) and (2) to form nitric acid but also NO:

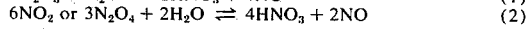

$$3N_2O_3 + H_2O \rightleftharpoons 2HNO_3 + 4NO \quad (1)$$
$$6NO_2 \text{ or } 3N_2O_4 + 2H_2O \rightleftharpoons 4HNO_3 + 2NO \quad (2)$$

Unless specifically stated otherwise, in the present Specification and claims $N_2O_3$ shall be understood to designate the equilibrium mixture of NO + NO$_2$ $\rightleftharpoons$ N$_2$O$_3$ resulting from the partial decomposition of one mol of N$_2$O$_3$. Likewise N$_2$O$_4$ shall be understood to designate the equilibrium mixture N$_2$O$_4$ $\rightleftharpoons$ 2NO$_2$ resulting from the partial decomposition of one mol of N$_2$O$_4$; or conversely NO$_2$ represents said equilibrium mixture resulting from the partial dimerization of one mol of NO$_2$.

The regeneration of NO in these self-oxidationreduction reactions of N$_2$O$_3$ and N$_2$O$_4$ respectively makes the overall conversion to nitric acid a progressive process. The operation is made more difficult by the fact that decreasing the concentration of either NO or oxygen retards the rate of forming the desired NO$_2$. As a result, it is extremely difficult to absorb the last traces of nitrogen oxides in the absorption system conventionally used in manufacturing nitric acid. Typically, the first two thirds of the absorption columns accomplish 98.5 percent of the operation but the remaining third is not sufficient to absorb completely the residual 1.5 percent and the tail gases contain at best 3 to 4 times as high a concentration of nitrogen oxides as is the present goal.

Attempts to lower the amounts of released nitrogen oxides by mere extension of the absorption system are fraught with difficult technical problems; also the additional installations would entail considerably increased investments.

In chemical plants utilizing nitric acid as a raw material, nitrogen oxide contaminants can be formed by the reaction of nitric acid with reducing agents. The products of such chemical reduction are sometimes limited to NO$_2$ (and N$_2$O$_4$) but the reduction may proceed further to NO. The effluents of these plants therefore have compositions similar to those found in nitric acid manufacture and can be subjected to the same treatments.

Among the prior methods proposed to limit the quantity of nitrogen oxide gases released into the atmosphere, there can be mentioned alkaline absorption which has the advantage of not generating more nitric oxide NO but also the disadvantage of not capturing any free NO. The reactions taking place in alkaline absorption are:

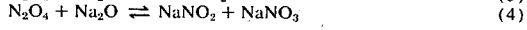

$$N_2O_3 + Na_2O \rightleftharpoons 2NaNO_2 \quad (3)$$
$$N_2O_4 + Na_2O \rightleftharpoons NaNO_2 + NaNO_3 \quad (4)$$

The Na$_2$O, which can be introduced as NaOH or Na$_2$CO$_3$ takes care of only NO$_2$ or its N$_2$O$_3$ compound with NO and permits any excess NO to escape, being inert to the alkali but capable of later reacting with atmospheric oxygen to form NO$_2$.

The NO present in the gas to be treated usually is so dilute that its oxidation is very slow and the molar conversion of NO into NO$_2$ is generally much less than the 50 percent required for complete absorption. Furthermore, the solution of nitrites and nitrates produced by this procedure cannot be released into natural waters but they are too dilute for recovery as commercially usable salts to be practical.

It has also been proposed to destroy the excess nitrogen oxides by burning them, as for example along with natural gas as a fuel. This has been found to be economically unfeasible, not because of the relatively small, say 0.2 percent, loss in nitric acid yield, but because of the considerable investments and running expenses which are involved in operating installations to dispose of the gases produced in the burner. Other methods using catalytic combustion require cumbersome use of expensive gases like hydrogen and methane as well as large investments for costly catalysts.

SUMMARY OF THE INVENTION

A simple means has now been found whereby the concentration of nitrogen oxides contained in effluent gases can be substantially reduced in a manner easy to operate and not requiring large investments or operating costs.

Briefly stated, this invention comprises two steps whereby (1) the effluent gases are oxidized to convert the nitrogen oxides substantially to a mixture of NO$_2$ and N$_2$O$_3$ and (2) the thus oxidized gases are passed through an aqueous solution containing an amount of hydrogen peroxide maintained at a level just sufficient to oxidize the NO$_2$ and N$_2$O$_3$ to HNO$_3$.

DETAILED DESCRIPTION

It is known that H$_2$O$_2$ does not oxidize nitric oxide NO to any appreciable extent when pure nitric oxide gas or nitric oxide diluted by nitrogen, argon, carbon dioxide or carbon monoxide is passed through an aqueous solution of $H_2O_2$. However if the NO is first oxidized by a suitable agent such as oxygen, ozone or nitric acid, to a mixture of $N_2O_3$ and $N_2O_4$, these gases are easily absorbed in $H_2O_2$ solution according to the overall reactions:

$$N_2O_3 + 2H_2O_2 \rightarrow 2HNO_3 + H_2O \quad (5)$$
$$N_2O_4 + H_2O_2 \rightarrow 2HNO_3 \quad (6)$$

Hydrogen peroxide is commonly considered to be very stable in nitric acid solutions as long as the $HNO_3$ concentration is well under the concentration range which is conducive to the formation of unstable nitrous and nitric peroxide. The upper limit of thus permissible $HNO_3$ concentration is generally around 50 percent by weight but it depends also on temperature and hydrogen peroxide concentration. However, the present inventors have found that in the course of absorbing $N_2O_4$ and $N_2O_3$ conditions are developed which cause a high rate of decomposition of $H_2O_2$ into $H_2O$ and $O_2$. When $H_2O_2$ is introduced into an absorption system without the special precautions of this invention, the loss by decomposition is so great that up to three or four times the stoichiometric amount must be used to obtain a satisfactory decrease in the nitrogen oxide content of the effluent gases.

Present inventors have unexpectedly found that such loss of $H_2O_2$ by decomposition is substantially eliminated if the $H_2O_2$ is added gradually at a rate corresponding to the rate at which it reacts to oxidize the nitrogen oxide gases according to equations (5) and (6), substantially avoiding any excess of $H_2O_2$.

This manner of operating has been found valuable in particular when NO is allowed to be oxidized by the oxygen present in the nitrogen oxide gases according to the reaction:

$$NO + \tfrac{1}{2} O_2 \rightleftharpoons NO_2 \quad (7)$$

which makes the absorption on the kinetics of this $NO_2$ formation from NO and requires the introduction of $H_2O_2$ at several points corresponding to the slowly progressive nature of the oxidation. When, on the other hand, the NO in the gas being absorbed has previously been oxidized either entirely or to the extent of 50 mol percent, injection of $H_2O_2$ at a single point suffices. Such previous oxidation can be carried out with any suitable reagent, exemplarily nitric acid or ozone. The action of nitric acid is the reverse of equations (1) and (2), as follows:

$$4NO + 2HNO_3 \rightleftharpoons 3N_2O_3 + H_2O \quad (1')$$
$$2NO + 4HNO_3 \rightleftharpoons 3N_2O_4 + 2H_2O \quad (2')$$

These reactions are very rapid in the gas phase. They have been the subject of many research studies and their physical chemistry is well understood.

The process for reducing the nitrogen oxide content of effluent gases according to the present invention is characterized by the stepwise accomplishment of (a) an oxidation of NO to $N_2O_3$ or $NO_2$ in the gas phase, followed by (b) an absorption in aqueous medium in presence of hydrogen peroxide carried out in such a manner that the quantity of $H_2O_2$ introduced is just sufficient to oxidize $N_2O_3$ or $NO_2$ to $HNO_3$ with substantial avoidance of excess $H_2O_2$.

According to one embodiment the oxidation step is carried out by $HNO_3$ but any oxidation agent capable of oxidizing NO can be utilized therefor.

This process can be used to treat any residual gas containing nitrogen oxides and is of particular interest as a manner of reducing the concentration of nitrogen oxides in the effluents from nitric acid manufacturing plants, as well as for the treatment of residual gases in chemical plants using nitric acid, such as those for passifying stainless steel and for nitration of organic compounds.

When nitric acid is used to effect the first oxidation step, this can be carried out by mixing the effluent gases with gaseous nitric acid in any suitable manner at a pressure from 1 to 20 bars, a temperature from $-10°$ C to $+40°$ C.

The reaction can be brought about, for example, by bubbling the effluent gas through an aqueous solution of nitric acid or by spraying the acid into the gas. It has been established that it is most suitable to use an installation wherein perfect liquid-gas equilibrium is maintained.

The minimum feasible concentration of nitric acid is dependent on the composition of the treated gas and the temperature. It is generally desired to use nitric acid substantially free of nitrogen oxides in order to lessen the consumption of hydrogen peroxide.

When treating residual gases from plants manufacturing $HNO_3$, the concentration of nitrogen oxides in the treated gas is generally between about 1,000 and 2,000 $cm^3/m^3$ which necessitates using $HNO_3$ of concentration 20–70% by weight at ambient temperature. In the case of other residual gases, $HNO_3$ concentration can vary from 20–85 percent.

In order to lower the consumption of $H_2O_2$, it is possible to modify this first stage by removing from the main circuit aqueous nitric acid containing dissolved therein part of the $NO_2$ formed. The $NO_2$ can then be separated from the nitric acid and reintroduced upstream into the main circuit, while the nitric acid can be recycled.

In the second stage of the process, the gases are treated in liquid medium by passage through an aqueous solution receiving continuously $H_2O_2$ in quantity such that the quantity of $H_2O_2$ introduced is substantially that which is necessary to oxidize the $N_2O_4$ and $N_2O_3$ while avoiding an excess of $H_2O_2$.

The treatment is generally effectuated at ambient temperature under a pressure of 1 to 20 bars on the gases which exit from the nitric acid oxidation at a temperature of $-10°$ C to $+40°$ C. The reaction is very rapid; therefore any equipment can be used which accomplishes substantially complete contact between gas and $H_2O_2$ solution. Inventors have established in particular that an installation corresponding to one theoretical plate serves particularly well.

The process for reducing the nitrogen oxide content of gaseous effluents according to the instant invention is particularly applicable to reducing the nitrogen oxide content of effluents from plants manufacturing nitric acid having absorption columns in stages. It suffices to subject one or several of such stages to the oxidation of the effluents by nitric acid and one or several other stages to the $H_2O_2$ treatments.

In building new installations for manufacturing $HNO_3$, the use of this process permits constructing at substantially reduced overall cost a system which can alternatively be operated to yield tail gases having nitrogen oxide content typical of the prior art, or to obtain a high degree of purification when necessary, or to realize any compromise desired between these two extremes.

A particular advantage of the instant method is its flexibility in that the quantity of $H_2O_2$ used can be adjusted to correspond to any desired degree of purification and to correspond to the changing variations during the course of production. The method is particularly adaptable to automatic control of the $H_2O_2$ used in proportion to the changing concentration of nitrogen oxides in the residual gases.

In comparison to other known procedures for the treatment of residual gases containing nitrogen oxides utilizing $H_2O_2$, it is unexpectedly economical since the consumption of $H_2O_2$ is a unique function of the concentration of nitrogen oxides in the gas to be treated, and the oxidizing power of the $H_2O_2$ is substantially completely utilized.

The following examples illustrate, without being limiting, the procedure according to this invention. In order to permit a better analysis of the phase being treated by $H_2O_2$ and in view of the fact that the oxidation of nitrogen oxides by $HNO_3$ is well known, the examples relate to the fixation of different pure nitrogen oxides by $H_2O_2$.

EXAMPLE 1

In the following procedures, a laboratory-scale fritted glass bubbler is used containing 50 cc of aqueous phase and connected with an absorption vessel containing standardized sodium hydroxide solution. In each example, there is passed through this system, at a rate of 150 liters per hour, a supply of nitrogen containing 2,000 cc of the specified nitrogen oxide per cubic meter. After equilibration of the liquid and gas phases, the operation is carried out for one hour and the following results are noted:

(1.1) The aqueous phase at the start is plain water. The nitrogen oxide is pure $NO_2$. In the absence of the $H_2O_2$ used in the instant invention, there is formed only 253 mg. of $HNO_3$, corresponding to 49% of the acid stoichiometrically equivalent to 2,000 cc/m$^3$ of $NO_2$ according to equation (2) above. The residual nitrogen oxides are totally absorbed in the sodium hydroxide, consisting therefore of a mixture of $NO_2$ and $N_2O_3$ and the salts formed are a mixture of $NaNO_2$ and $NaNO_3$ very rich in nitrite.

(1.2) The aqueous phase is an aqueous solution of 40 grams of $H_2O_2$ per liter. The nitrogen oxide is pure $NO_2$. The amount of $HNO_3$ formed is 633 mg. and 0.42 grams of $H_2O_2$ have disappeared. The final concentration of $H_2O_2$ is 31.6 grams/liter. The 633 mg. of $HNO_3$ corresponds to 121% of the acid which would theoretically result from the reaction (2) upon the 2,000 cc/m$^3$ of $NO_2$. The residual nitrogen oxides are totally absorbed in the sodium hydroxide, forming a 50/50 molar ratio of $NaNO_3$ and $NaNO_2$, corresponding to the effluent nitrogen oxide gas being entirely $NO_2$.

The consumption of $H_2O_2$ is 1.23 mols of $H_2O_2$ per mol of $HNO_3$ formed.

(1.3) The aqueous phase is an aqueous solution of 40 grams of $H_2O_2$ per liter. The nitrogen oxide is pure NO. The amount of $HNO_3$ formed is 24.4 mg. and 0.05 grams of $H_2O_2$ have disappeared, the final concentration being 39 grams/liter. The 24.4 mg. of $HNO_3$ corresponds to 3% conversion of the NO supplied at 2,000 cc/m$^3$. The residual nitrogen oxides are not absorbed in the sodium hydroxide, only traces of $NaNO_2$ being formed. The consumption of $H_2O_2$ is 3.8 mols of $H_2O_2$ per mol of $HNO_3$ formed.

(1.4) The aqueous phase is an aqueous solution of 40 grams/liter of $H_2O_2$ and the nitrogen oxide is a mixture of equal parts of NO and $NO_2$ corresponding to $N_2O_3$.

The amount of $HNO_3$ formed is 470 mg. and 0.56 grams of $H_2O_2$ have disappeared, the final concentration being 28.8 grams/liter.

The 470 mg. of $HNO_3$ corresponds to 180% of the acid which would be expected to form from 2,000 cc of $N_2O_3$ per cubic meter, according to the reaction (1) above. The nitrogen oxide residuals are totally absorbed in the sodium hydroxide and form $NaNO_2$ with a small amount of $NaNO_3$.

The consumption of $H_2O_2$ is 2.20 mols per mol of $HNO_3$ formed.

(1.5) The aqueous phase at the start is plain water, and the nitrogen oxide is pure $NO_2$. During the course of the hour's operation, there is continuously added by means of a measuring pump 0.07 cc/min. of an aqueous solution of 35 grams $H_2O_2$ per liter.

The amount of $HNO_3$ formed is 460 mg. and the total disappearance of introduced $H_2O_2$ is 147. The 460 mg. of $HNO_3$ corresponds to 87.5% of the stoichiometric amount corresponding to the 2,000 cc/m$^3$ of $NO_2$. Without $H_2O_2$ the corresponding yield in Example (1.1) is only 49 percent. The nitrogen oxide residuals are totally absorbed in the sodium hydroxide and form a 50/50 molar mixture of $NaNO_3$ and $NaNO_2$. The consumption of $H_2O_2$ is only 0.59 mols per mol of $HNO_3$ formed as compared to 0.50 mols calculated theoretically from the reaction

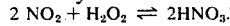

EXAMPLE 2

During a winter period when the exterior temperature does not exceed 10° C, the last absorption column of an installation for the nitric acid production of type 165/T/J having 16 plates operating under a pressure of 4 bars absolute, receives per hour 22000 cubic meter of gas containing 0.15 volume percent of nitrogen oxides and releases a residual gas containing 0.07% volume percent of nitrogen oxides.

There is introduced at the head of this column a stream of water at the rate of 7000 liters/hour and a stream of 35% by weight aqueous hydrogen peroxide (corresponding to a solution of 56 grams $H_2O_2$ per liter) at a rate of 115 liters/hour, the usual feed supplied to the column at this location being 800 liters of water per hour.

After stabilization of the acid concentrations and gas compositions on the column, it is found that the residual gases contain between 0.017 and 0.018 percent of nitrogen oxides and this is confirmed by analysis of samples of the 10 highest plates.

By determination of the quantity of supplementary $HNO_3$ formed and of the consumption of $H_2O_2$, it is observed that 4.40 mols of $H_2O_2$ are consumed per mol of supplementary nitric acid formed. This calculation is a formal one since the acid which would normally form on these plates in the absence of $H_2O_2$ also consumes $H_2O_2$.

The use of $H_2O_2$ under these conditions shows that it is possible to reduce the residual nitrous oxide concentration to 200 cc per cubic meter by consuming 6.9 Kg. of 100% $H_2O_2$ per ton of nitric acid leaving the installation.

Example 3

During a summer period when the exterior temperature can reach 25° C the last column of the same installation as in Example 2 receives 0.35 volume percent of nitrogen oxides and releases at the rate of 22000 cm/h a residual gas containing 0.15 volume percent.

There is introduced at the last, sixteenth, plate and also at plate 11, two streams, each being respectively 30 liters per hour of 35% aqueous $H_2O_2$, plate 16 receiving in addition 750 liters per hour of water for the absorption.

After establishment of a steady state on the column, it is observed that the residual nitrogen oxides have shifted toward 0.08 volume percent and that the acid produced has been increased by about 3.5 grams/liter at plate 9.

Plates 10 and 15 again have a considerable concentration of $H_2O_2$, namely 2 and 6 grams/liter respectively, showing that the utilization of $H_2O_2$ has been incomplete.

By analysis both of the supplementary quantity of $HNO_3$ formed and of the amount of $H_2O_2$ consumed, it is observed that 1.6 mols of $H_2O_2$ are consumed per mol of supplementary $HNO_3$ formed, which corresponds to 3.5 Kg. of $H_2O_2$ per ton of $HNO_3$.

EXAMPLE 4

This example describes an industrial-scale operation in a column carrying out successively the oxidation of nitric oxide, NO, by nitric acid in the vapor phase, followed by the absorption of the resulting oxidized gases by hydrogen peroxide in aqueous medium.

The column used in this example contains 16 plates and is the last column of a unit producing 165 tons of nitric acid per day and operating under an absolute pressure of 4 bars. During a summer period when the exterior temperature can reach 25°C, this column receives gases containing 0.35% of nitrogen oxides. Without the modification of this example, the gas released at the rate of 22000 cubic meters per hour from this column contains 0.15% of nitrogen oxides.

The circuit of liquid flow through this column is changed so as to isolate two successive plates situated at midheight. The higher of these plates without liquid circulation serves as a "scrubber", the plate beneath it is supplied with 2 cubic meters per hour of an independent nitric acid stream whose concentration is maintained at about 52% $HNO_3$ by continuous withdrawal of a weak fraction (about 10%) from production. The volume of circulating acid is thus kept constant by a continuous removal to the storage tank.

Into each of the three plates immediately above those containing the concentrated acid there is introduced a 30 liters/hr. stream of 35% aqueous solution of hydrogen peroxide.

The plate situated at the top of the column (plate 16) receives, as in the preceding examples, the remaining water, flowing at about 750 liters/hr., which circulates through three plates before reaching those which receive hydrogen peroxide.

These modifications have the effect of diminishing very significantly the concentration of nitrogen oxides at the exit of the column. After the plates reach a steady state, the concentration of nitrogen oxides in the residual gases has settled to a level of 0.045% by volume.

The consumption of hydrogen peroxide corresponds to 5.1 Kg. of 100% $H_2O_2$ per ton of nitric acid produced.

What we claim is:

1. A process for reducing the level of nitrogen oxide contaminants in an industrial effluent gas, which comprises (a) oxidizing the lower valenced nitrogen oxides of said gas to a mixture of substantailly $N_2O_3$ and $NO_2$ and (b) treating the nitrogen oxide contaminants with an aqueous solution of hydrogen peroxide maintained at a concentration level that is substantially the stoichiometric quantity required to oxidize the $N_2O_3$ and $NO_2$ to $HNO_3$.

2. The process of claim 1 wherein the lower valenced nitrogen oxides are oxidized with nitric acid.

3. The process of claim 2 wherein the nitric acid is introduced in the vapor state into the current of effluent gas containing said contaminants.

4. A process according to claim 2 wherein the nitric acid is treated for the removal of dissolved nitrogen dioxide and the nitrogen dioxide is removed therefrom.

5. A process according to claim 4 in which the removed nitrogen dioxide is reintroduced into the effluent gas stream at a point between the nitric acid treatment and the hydrogen peroxide treatment.

6. A process according to claim 4 wherein the nitric acid is recycled back into nitric acid system after the dissolved nitrogen dioxide has been removed.

* * * * *

UNITED STATES PATENT AND TRADEMARK OFFICE
CERTIFICATE OF CORRECTION

PATENT NO. : 3,991,167
DATED : November 9, 1976
INVENTOR(S) : Rene Depommier and Edouard Martin It is certified that error appears in the above-identified patent and that said Letters Patent are hereby corrected as shown below:

Column 3, Line 37, "absorption on the kinetics", should be --absorption dependent on the kinetics--

Signed and Sealed this

Nineteenth Day of April 1977

[SEAL]

Attest:

RUTH C. MASON
Attesting Officer

C. MARSHALL DANN
Commissioner of Patents and Trademarks